(12) United States Patent
Koch et al.

(10) Patent No.: US 7,049,264 B1
(45) Date of Patent: May 23, 2006

(54) SUPPORTED CATALYST FOR OLEFIN POLYMERIZATION

(75) Inventors: Matthias Koch, Wiesbaden (DE); Martin Stork, Hamm (DE); Markus Klapper, Mainz (DE); Klaus Müllen, Köln (DE); Heike Gregorius, Bubach (DE); Ursula Rief, Heddesheim (DE)

(73) Assignees: Basell Polyolefine GmbH, Wesseling (DE); Max-Planck Gesellschaft zur Förderung d. Wissenschaften e.V., Munich (DE)

( * ) Notice: Subject to any disclaimer, the term of this patent is extended or adjusted under 35 U.S.C. 154(b) by 138 days.

(21) Appl. No.: 10/009,831

(22) PCT Filed: Jun. 7, 2000

(86) PCT No.: PCT/EP00/05256

§ 371 (c)(1),
(2), (4) Date: May 16, 2003

(87) PCT Pub. No.: WO00/78823

PCT Pub. Date: Dec. 28, 2000

(30) Foreign Application Priority Data

Jun. 17, 1999 (DE) .......................... 199 27 766

(51) Int. Cl.
*B01J 31/00* (2006.01)

(52) U.S. Cl. .................. 502/150; 502/158; 502/159
(58) Field of Classification Search ................ 502/150, 502/158, 159
See application file for complete search history.

(56) References Cited

U.S. PATENT DOCUMENTS

| | | | |
|---|---|---|---|
| 4,794,096 A | 12/1988 | Ewen | |
| 5,071,808 A * | 12/1991 | Antberg et al. | 502/107 |
| 5,169,818 A * | 12/1992 | Antberg et al. | 502/159 |
| 5,371,260 A | 12/1994 | Sangokoya | |
| 5,391,793 A | 2/1995 | Marks | |
| 5,498,581 A * | 3/1996 | Welch et al. | 502/102 |
| 5,565,592 A * | 10/1996 | Patsidis et al. | 556/11 |
| 5,714,425 A * | 2/1998 | Chabrand et al. | 502/117 |
| 6,150,297 A * | 11/2000 | Campbell et al. | 502/152 |
| 6,166,152 A * | 12/2000 | Benham et al. | 526/64 |
| 6,180,737 B1 * | 1/2001 | Kristen et al. | 526/161 |
| 6,221,981 B1 * | 4/2001 | Jung et al. | 526/64 |
| 6,232,413 B1 * | 5/2001 | Starzewski et al. | 526/134 |
| 6,248,540 B1 * | 6/2001 | Weinberg et al. | 435/7.1 |
| 6,265,339 B1 * | 7/2001 | Bidell et al. | 502/104 |
| 6,268,444 B1 * | 7/2001 | Klosin et al. | 526/127 |
| 6,291,382 B1 * | 9/2001 | Koppl et al. | 502/103 |

(Continued)

FOREIGN PATENT DOCUMENTS

| | | |
|---|---|---|
| DE | 198 21949 | 11/1998 |
| EP | 284 708 | 10/1988 |
| EP | 295 312 | 12/1988 |
| EP | 621 279 | 10/1994 |
| EP | 633 264 | 1/1995 |
| WO | 91/09882 | 7/1991 |
| WO | 94/28034 | 12/1994 |
| WO | 98/01481 | 1/1998 |
| WO | 99/60035 | 11/1999 |

OTHER PUBLICATIONS

Macromol.RapidCom.20,210–213,1999,Stork et al.
Science,vol. 280,Apr. 10, 1998,Roscoe et al., 270–273.
Chem.Commun.,1998 Barrett et al., 2079–2080.

*Primary Examiner*—Mark L. Bell
*Assistant Examiner*—Jennine Brown
(74) *Attorney, Agent, or Firm*—Jason D. Voight

(57) ABSTRACT

A supported catalyst for olefin polymerization comprises
A) as support material, a copolymer comprising the monomer units I, II and III,
where the monomer units I have the formula (I) and the monomer units II have the formula (II),

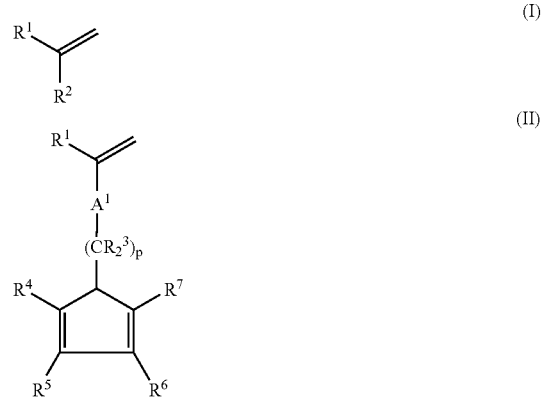

where the variables have the following meanings:
$R^1$ is hydrogen, $C_1$–$C_4$-alkyl or phenyl,
$R^2$ is substituted or unsubstituted aryl or branched or unbranched alkyl or alkenyl,
$A^1$ is a direct chemical bond or a substituted or unsubstituted phenylene group,
$R^3$ are identical or different and are each hydrogen, $C_1$–$C_{10}$-alkyl or substituted or unsubstituted phenyl,
p is an integer from 0 to 8, and
$R^4$ to $R^7$ are hydrogen, $C_1$–$C_{10}$-alkyl or substituted or unsubstituted phenyl,
and the monomer units III have polar groups, and
B) at least one metallocene complex and
C) at least one compound capable of forming metallocenium ions.

A process for preparing such supported catalysts, copolymers suitable as support material and a process for the polymerization of olefins in the presence of a catalyst according to the present invention are also provided.

9 Claims, No Drawings

U.S. PATENT DOCUMENTS

| | | | |
|---|---|---|---|
| 6,329,478 B1 * | 12/2001 | Katayama et al. | 526/127 |
| 6,329,486 B1 * | 12/2001 | Shankar et al. | 526/347 |
| 6,372,930 B1 * | 4/2002 | Schertl et al. | 556/87 |
| 6,388,040 B1 * | 5/2002 | Fujita et al. | 526/348 |
| 6,433,110 B1 * | 8/2002 | Lynch et al. | 526/129 |
| 6,444,766 B1 * | 9/2002 | Stork et al. | 526/170 |
| 6,537,943 B1 * | 3/2003 | Fritze et al. | 502/152 |
| 6,583,253 B1 * | 6/2003 | Fischer et al. | 526/348 |
| 6,605,560 B1 * | 8/2003 | Chang | 502/104 |
| 6,683,018 B1 * | 1/2004 | Kristen et al. | 502/150 |

\* cited by examiner

SUPPORTED CATALYST FOR OLEFIN POLYMERIZATION

The present invention relates to a supported catalyst for olefin polymerization comprising
A) as support material, a copolymer comprising the monomer units I, II and III,
where the monomer units I have the formula (I) and the monomer units II have the formula (II),

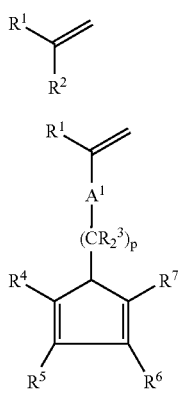

where the variables have the following meanings:
$R^1$ is hydrogen, $C_1$–$C_4$-alkyl or phenyl,
$R^2$ is substituted or unsubstituted aryl or branched or unbranched alkyl or alkenyl,
$A^1$ is a direct chemical bond or a substituted or unsubstituted phenylene group,
$R^3$ are identical or different and are each hydrogen, $C_1$–$C_{10}$-alkyl or substituted or unsubstituted phenyl,
p is an integer from 0 to 8, and
$R^4$ to $R^7$ are hydrogen, $C_1$–$C_{10}$-alkyl or substituted or unsubstituted phenyl,
and the monomer units III have polar groups, and
B) at least one metallocene complex and
C) at least one compound capable of forming metallocenium ions.

The invention also relates to a process for preparing such supported catalysts, copolymers suitable as support material and a process for the polymerization of olefins in the presence of a catalyst according to the present invention.

Supported transition metal catalysts have been known for a long time and are used, for example, for olefin polymerization. The activity and productivity of these catalysts depends very much on the method by which they are produced. As support materials for such transition metal catalysts, it is customary to use crosslinked polymers or inorganic support materials, for example silica gel. Examples of such supported catalysts are described, for example, in WO 94/28034, in EP-A 295 312 and in WO 98/01481.

When fixing metallocenes to the surface of inorganic materials and in the subsequent polymerization, some undesirable effects can occur. Thus, it is difficult to distribute the catalyst component homogeneously over the surface of the porous support material. During the course of the polymerization, fragmentation of the catalyst and the support material generally occurs. Owing to the inhomogeneous distribution of the catalyst components on the surface of the support, the fragmentation again forms inhomogeneous catalyst particles which can have an adverse effect on the polymerization products.

When the metallocenes are supported on crosslinked polymers, one frequently encounters the problem that, as a result of incomplete swelling of the crosslinked polymer particles, only an inhomogeneous distribution of the metallocenes on the support is once more achieved.

S. B. Roscoe, J. M. Fréchet, J. M. Walzer and A. J. Dias, Science 280, 1998, pages 270–273, describe a supported catalyst in which a divinylbenzene-crosslinked, chloromethylated polystyrene was reacted in succession with a secondary amine, an ammonium salt of a weakly coordinating anion and an uncharged dialkyl metallocene. This gave a polymerization-active catalyst. However, at elevated polymerization temperatures, the polymer morphology obtained was unsatisfactory and polymerization could only be carried out using hafnocenes.

A. G. M. Barrett and Y. R. de Miguel, Chem. Commun. 1998, pages 2079 ff, disclosed a catalyst in which a peralkylated titanocene complex was covalently bound to a polystyrene support. The unpublished German Patent Application No. 19821949.0 likewise describes a process in which metallocene complexes are covalently bound to a polystyrene support. However, in the case of metallocenes having a more complicated structure, as are required, for example, for the stereoselective polymerization of propylene, the corresponding synthesis is very difficult or can no longer be carried out.

It is an object of the present invention to find supported catalysts which no longer have the disadvantages of the prior art and have a homogeneous distribution of the catalyst components on the support material, which can be prepared without any great difficulty using many different metallocene systems and which also give a good polymer morphology at an elevated polymerization temperature.

We have found that this object is achieved by the supported catalyst for olefin polymerization defined at the outset. Furthermore, we have found a process for preparing such supported catalysts, copolymers suitable as support material and a process for the polymerization of olefins in the presence of a catalyst according to the present invention.

The supported catalyst of the present invention for olefin polymerization comprises as support material A) a copolymer comprising at least the monomer units I, II and III. Among these monomer units, the monomer unit I serves as basic framework of the support material. The monomer unit II allows crosslinking of the polymer chains by means of a Diels-Alder reaction of the cyclopentadienyl radicals. The monomer unit III introduces sufficient polarity into the copolymer A) for the active components B) and C) to be fixed to the support material, even though they are not covalently bound.

The radical $R^1$ in the monomers I, II and III can in each case be hydrogen, a $C_1$–$C_4$-alkyl group, i.e. methyl, ethyl or the various isomers of propyl or butyl, or phenyl. Preferably, $R^1$ is in each case hydrogen or methyl and in particular hydrogen.

The radical $R^2$ in the formula (I) is preferably substituted or unsubstituted phenyl, pyrenyl, naphthyl or alkenyl. Preferred monomers I are styrene, butadiene and isoprene.

In the formula (II), the variable $A^1$ is a direct chemical bond or a substituted or unsubstituted phenylene group; $A^1$ is preferably a direct chemical bond or a p-phenylene group.

The substituents $R^3$ in the formula (II) can be identical or different and are preferably hydrogen, methyl, ethyl or the various isomers of propyl or phenyl and are in particular hydrogen or methyl.

The variable n of the formula (II) is preferably 0 or 1.

The cyclopentadienyl radical in the formula (II) can be unsubstituted, in which case the radicals $R^4$ to $R^7$ are each hydrogen. However, it can also be monosubstituted to tetrasubstituted. Suitable substituents $R^4$ to $R^7$ are then $C_1$–$C_{10}$-alkyl groups, i.e. methyl, ethyl and the various isomers of propyl, butyl, pentyl, hexyl, heptyl, octyl, nonyl or decyl. Further suitable radicals $R^4$ to $R^7$ are substituted or unsubstituted phenyl radicals, in particular unsubstituted phenyl radicals. However, the cyclopentadienyl radicals in the formula (II) are particularly preferably unsubstituted.

Particularly preferred monomer units II are those in which $A^1$ is p-phenylene, p is 1 and $R^3$ and $R^4$ to $R^7$ are each hydrogen or those in which $A^1$ is a direct bond, p is 1, $R^3$ are each methyl and $R^4$ to $R^7$ are each hydrogen.

The monomer units III are compounds which can be copolymerized with the monomers I and II or with monomers which can be converted into the monomer units I and II and have polar groups.

Preferred monomer units III are compounds of the formula (IIIa),

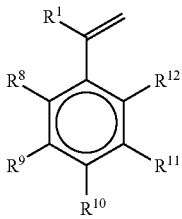
(IIIa)

where
$R^8$ to $R^{12}$ are hydrogen, $C_1$–$C_{10}$-alkyl, 5- to 7-membered cycloalkyl which may in turn bear $C_1$–$C_{10}$-alkyl groups as substituents, $C_6$–$C_{15}$-aryl or arylalkyl,
or adjacent radicals may in each case form a saturated or unsaturated ring having from 5 to 15 carbon atoms,
but at least one radical $R^8$ to $R^{12}$ is a group of the formula (IV),

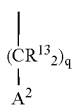
(IV)

where
$R^{13}$ are identical or different and are each hydrogen, $C_1$–$C_{10}$-alkyl or substituted or unsubstituted phenyl,
q is an integer from 0 to 8 and
$A^2$ is $OR^{14}$, $NR^{14}R^{15}$, $PR^{14}R^{15}$, CN, $COOR^{14}$ or (O—$(CH_2)_{q'})_{q''}$—$OR^{14}$, where $R^{14}$ and $R^{15}$ are identical or different and are each hydrogen or $C_1$–$C_4$-alkyl and q' is an integer from 1 to 5 and q" is an integer from 1 to 8.

Particularly preferred monomer units of the formula (IIIa) are those in which from one to three radicals $R^8$ to $R^{12}$ are a group of the formula (IV). In particular, preference is also given to monomers of the formula (IIIa) in which only one radical $R^8$ to $R^{12}$ is a group of the formula (IV), with the further radicals $R^8$ to $R^{12}$ then being hydrogen.

Preferred groups of the formula (IV) are those in which q is 0 or 1 and $A^2$ is $OR^{14}$ and is in particular methoxy or hydroxy. $R^{13}$ is preferably hydrogen or methyl and q' is preferably 1, 2 or 3. Preference is also given to groups of the formula (IV) in which q is 2. $R^{13}$ is hydrogen and $A^2$ is hydroxy or (O—$C_2H_4)_{q''}$—OH. Also preferred are groups in which $A^2$ is CN.

For the radicals $R^8$ to $R^{12}$ which are not a group of the formula (IV), particular preference is given to hydrogen or $C_1$–$C_4$-alkyl, phenyl or tetramethylcyclopentadienyl.

Examples of suitable monomer units of the formula (IIIa) are p-methoxymethylstyrene, p-hydroxystyrene, p-methoxystyrene, (2-hydroxyethyl)styrene, trimethoxystyrene, (dimethylhydroxymethyl)styrene and (methoxymethyl)(methoxy)styrene.

Further preferred monomer units III are compounds of the formula (IIIb),

(IIIb)

where
$A^3$ is $COOR^{16}$ or CN, where
$R^{16}$ is hydrogen or $C_1$–$C_{10}$-alkyl.

Here, mention may be made of, for example, acrylic esters, methacrylic ester, acrylonitrile and methacrylonitrile.

The monomer units I, II or III used in the copolymers A) can also in each case be mixtures of various compounds of the formulae (I), (II), (IIIa) and/or (IIIb). Any further olefinic comonomers can also be present in the copolymers (A) provided that they do not interfere in the synthesis of the copolymers. However, the copolymers (A) preferably contain only the monomer units I, II and III.

The ratios of the monomer units I, II and III can be varied within a wide range. It is usual to employ a larger proportion of I. The proportion of monomer units II in the total copolymer is advantageously from 3 to 30 mol %, based on the total mass of the copolymer, particularly preferably from 10 to 20 mol %. The proportion of monomer units III in the total copolymer is preferably from 10 to 40 mol %, based on the total mass of the copolymer, particularly preferably from 20 to 30 mol %.

The copolymers A) can be prepared by copolymerization of compounds of the formulae (I), (II) and (IIIa) and/or (IIIb) or of compounds which can be converted into the corresponding monomer units by polymer-analogous reactions. The copolymerization can be carried out in a customary manner known to those skilled in the art, for example by a free-radical or anionic mechanism. The copolymers A) are preferably prepared by free-radical polymerization. The copolymers A) generally have a molar mass $M_w$ (weight average) in the range from 15000 to 70000 g/mol, preferably from 30000 to 50000 g/mol. The width of the molar mass distribution $M_n/M_w$ is generally from 2 to 3.

Although the monomer units I are usually introduced into the copolymers A) using monomers which already have the appropriate structural features, the monomer units II are normally introduced by polymerizing monomers II' which are then converted into the monomer units II in a polymer-analogous reaction. In this case, the monomers II' have replaceable leaving groups via which the cyclopentadiene ring can be introduced into the monomer units II.

Suitable replaceable leaving groups are, for example, nucleophilically replaceable leaving groups such as halogens, i.e. fluorine, chlorine, bromine or iodine, or further nucleophilically replaceable leaving groups with which those skilled in the art are familiar, e.g. tosylate, trifluoroacetate, acetate or azide. A preferred monomer II' is p-(chloromethyl)styrene.

After the polymerization, the nucleophilically replaceable leaving groups of the monomers II' can then be reacted with a cyclopentadienyl compound by various methods with which those skilled in the art are familiar. For example, the cyclopentadiene compound can be converted into the cyclopentadienyl anion by means of a strong base such as butyllithium or sodium hydride or by means of an elemental alkali metal, for example sodium. This cyclopentadienyl anion can then replace the nucleophilically replaceable leaving group in a nucleophilic substitution reaction.

It is also possible to use monomers II' having leaving groups which can be converted into metal-containing functional groups after the polymerization. Examples of appropriate metal-containing functional groups are —Li, —MgX$^4$, where X$^4$ is halogen, i.e. fluorine, chlorine, bromine or iodine. Examples of such monomers II' are p-halostyrenes, preferably p-bromostyrene, in which the halogen can be replaced by the metal-containing functional group. It is then possible to react the resulting organometallic compound with a fulvene compound, thus forming monomer units II.

Suitable fulvene compounds bear two identical or different radicals $C_1$–$C_4$-alkyl or substituted or unsubstituted phenyl on the methylene carbon; preferred substituents are methyl, ethyl or the various isomers of propyl or phenyl and in particular methyl. A particularly preferred fulvene IIIa is dimethyl fulvene.

Monomer units III can be introduced into the copolymers A) by the use of monomers having an appropriate structure, for example those of the formula (IIIb). However, it is here also possible to polymerize monomer units III' and then to convert these into monomer units III by polymer-analogous reactions. For example, halogen-containing monomers III' such as chloromethylstyrene can be converted into monomer units III containing methoxy groups, for example methoxymethylstyrene, by reaction with a methoxide.

In addition, the supported catalysts of the present invention for olefin polymerization further comprise at least one metallocene complex B). Suitable metallocene complexes are, in particular, those of the formula (V)

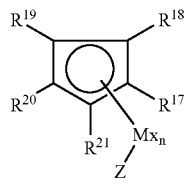

(V)

where the substituents and indices have the following meanings:

M is titanium, zirconium, hafnium, vanadium, niobium, tantalum or chromium or an element of transition group III of the Periodic Table and the lanthanides, X is fluorine, chlorine, bromine, iodine, hydrogen, $C_1$–$C_{10}$-alkyl, $C_6$–$C_{15}$-aryl, alkylaryl having from 1 to 10 carbon atoms in the alkyl part and from 6 to 20 carbon atoms in the aryl part, —OR$^{22}$ or —NR$^{22}$R$^{23}$, n is 1, 2 or 3, where n corresponds to the valence of M minus 2, where R$^{22}$ and R$^{23}$ are $C_1$–$C_{10}$-alkyl, $C_6$–$C_{15}$-aryl, alkylaryl, arylalkyl, fluoroalkyl or fluoroaryl each having from 1 to 10 carbon atoms in the alkyl radical and from 6 to 20 carbon atoms in the aryl radical and the radicals X are identical or different, R$^{17}$ to R$^{21}$ are hydrogen, $C_1$–$C_{10}$-alkyl, 5- to 7-membered cycloalkyl which may in turn bear $C_1$–$C_{10}$-alkyl groups as substituents, $C_6$–$C_{15}$-aryl or arylalkyl, where two adjacent radicals may together form a saturated or unsaturated cyclic group having from 4 to 15 carbon atoms, or Si(R$^{24}$)$_3$ where R$^{24}$ can be $C_1$–$C_{10}$-alkyl, $C_3$–$C_{10}$-cycloalkyl or $C_6$–$C_{15}$-aryl and Z is X or

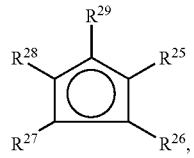

where the radicals

R$^{25}$ to R$^{29}$ are hydrogen, $C_1$–$C_{10}$-alkyl, 5- to 7-membered cycloalkyl which may in turn bear $C_1$–$C_{10}$-alkyl groups as substituents, $C_6$–$C_{15}$-aryl or arylalkyl and two adjacent radicals may also together form a saturated or unsaturated cyclic group having from 4 to 15 carbon atoms, or Si(R$^{30}$)$_3$ where R$^{30}$ is $C_1$–$C_{10}$-alkyl, $C_3$–$C_{10}$-cycloalkyl or $C_6$–$C_{15}$-aryl, or the radicals R$^{20}$ and Z together form an —R$^{31}$—A— group in which

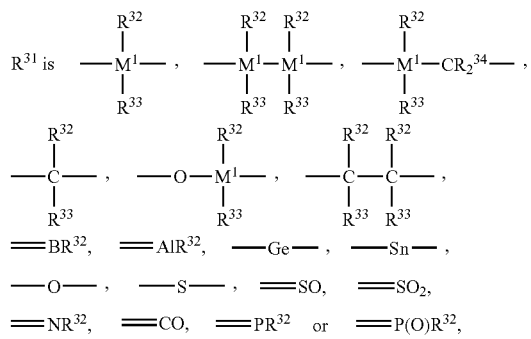

where

R$^{32}$, R$^{33}$ and R$^{34}$ are identical or different and are each a hydrogen atom, a halogen atom, a $C_1$–$C_{10}$-alkyl group, a $C_1$–$C_{10}$-fluoroalkyl group, a $C_6$–$C_{10}$-fluoroaryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group or two adjacent radicals together with the atoms connecting them form a saturated or unsaturated ring having from 4 to 15 carbon atoms, and M$^1$ is silicon, germanium or tin, A is —O—, —S—,

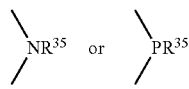

where

R$^{35}$ is $C_1$–$C_{10}$-alkyl, $C_6$–$C_{15}$-aryl, $C_3$–$C_{10}$-cycloalkyl, $C_7$–$C_{18}$-alkylaryl or Si(R$^{36}$)$_3$, R$^{36}$ is hydrogen, $C_1$–$C_{10}$-alkyl, $C_6$–$C_{15}$-aryl, which may in turn bear $C_1$–$C_4$-alkyl groups as substituents or $C_3$–$C_{10}$-cycloalkyl, or the radicals R$^{20}$ and R$^{28}$ together form an —R$^{31}$— group. The radicals X in the formula (V) are preferably identical.

Among the metallocene complexes of the formula (IV), preference is given to

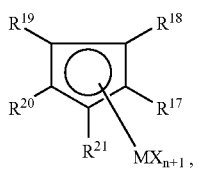 (Va)

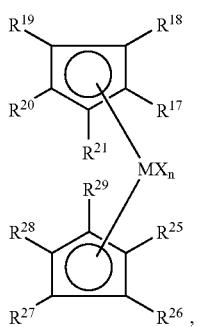 (Vb)

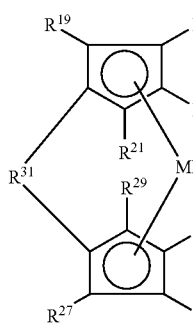 (Vc)

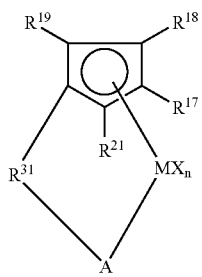 (Vd)

Among the compounds of the formula (Va), particular preference is given to those in which
M is titanium, zirconium or hafnium,
X is chlorine, $C_1$–$C_4$-alkyl or phenyl,
n is 2 and
$R^{17}$ to $R^{21}$ are hydrogen or $C_1$–$C_4$-alkyl.

Among the compounds of the formula (Vb), preference is given to those in which
M is titanium, zirconium or hafnium,
X is chlorine, $C_1$–$C_4$-alkyl or phenyl,
n is 2,
$R^{17}$ to $R^{21}$ are hydrogen, $C_1$–$C_4$-alkyl or $Si(R^{24})_3$ and
$R^{25}$ to $R^{29}$ are hydrogen, $C_1$–$C_4$-alkyl or $Si(R^{30})_3$.

Particularly suitable compounds of the formula (Vb) are those in which the cyclopentadienyl radicals are identical.
Examples of particularly useful compounds are:
bis(cyclopentadienyl)zirconium dichloride,
bis(pentamethylcyclopentadienyl)zirconium dichloride,
bis(methylcyclopentadienyl)zirconium dichloride,
bis(ethylcyclopentadienyl)zirconium dichloride,
bis(n-butylcyclopentadienyl)zirconium dichloride and
bis(trimethylsilylcyclopentadienyl)zirconium dichloride
and also the corresponding dimethylzirconium compounds.

Among the compounds of the formula (Vc), particularly suitable compounds are ones in which
$R^{17}$ and $R^{25}$ are identical and are hydrogen or $C_1$–$C_{10}$-alkyl groups,
$R^{21}$ and $R^{29}$ are identical and are hydrogen or methyl, ethyl, isopropyl or tert-butyl groups,
$R^{19}$ and $R^{27}$ are $C_1$–$C_4$-alkyl and
$R^{18}$ and $R^{26}$ are hydrogen or
two adjacent radicals $R^{18}$ and $R^{19}$ or $R^{26}$ and $R^{27}$ together form a saturated or unsaturated cyclic group having from 4 to 12 carbon atoms,

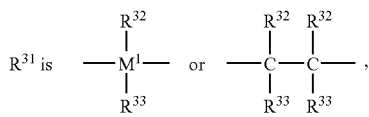

M is titanium, zirconium or hafnium and
X is chlorine, $C_1$–$C_4$-alkyl or phenyl.
Examples of particularly useful complexes are:
dimethylsilanediylbis(cyclopentadienyl)zirconium dichloride,
dimethylsilanediylbis(indenyl)zirconium dichloride,
dimethylsilanediylbis(tetrahydroindenyl)zirconium dichloride,
ethylenebis(cyclopentadienyl)zirconium dichloride,
ethylenebis(indenyl)zirconium dichloride,
ethylenebis(tetrahydroindenyl)zirconium dichloride,
tetramethylethylene-9-fluorenylcyclopentadienylzirconium dichloride,
dimethylsilanediylbis(3-tert-butyl-5-methylcyclopentadienyl)zirconium dichloride,
dimethylsilanediylbis(3-tert-butyl-5-ethylcyclopentadienyl)zirconium dichloride,
dimethylsilanediylbis(2-methylindenyl)zirconium dichloride,
dimethylsilanediylbis(2-isopropylindenyl)zirconium dichloride,
dimethylsilanediylbis(2-tert-butylindenyl)zirconium dichloride,
diethylsilanediylbis(2-methylindenyl)zirconium dibromide,
dimethylsilanediylbis(3-methyl-5-methylcyclopentadienyl)zirconium dichloride,
dimethylsilanediylbis(3-ethyl-5-isopropylcyclopentadienyl)zirconium dichloride,
dimethylsilanediylbis(2-ethylindenyl)zirconium dichloride,
dimethylsilanediylbis[3,3'-(2-methylbenzindenyl)]zirconium dichloride,
dimethylsilanediylbis[3,3'-(2-ethylbenzindenyl)]zirconium dichloride,
methylphenylsilanediylbis[3,3'-(2-ethylbenzindenyl)]zirconium dichloride,
methylphenylsilanediylbis[3,3'-(2-methylbenzindenyl)]zirconium dichloride, diphenylsilanediylbis[3,3'-(2-methylbenzindenyl)]
zirconium dichloride,
diphenylsilanediylbis[3,3'-(2-ethylbenzindenyl)]
zirconium dichloride, and
diphenylsilanediylbis(2-methylindenyl)hafnium dichloride
and also the corresponding dimethyl zirconium compounds.
Further examples of suitable complexes are:
dimethylsilanediylbis(2-methyl-4-phenylindenyl)
zirconium dichloride,
dimethylsilanediylbis(2-methyl-4-(p-tert-butylphenyl)
indenyl)zirconium dichloride,
dimethylsilanediylbis(2-methyl-4-naphthylindenyl)
zirconium dichloride,
dimethylsilanediylbis(2-methyl-4-isopropylindenyl)
zirconium dichloride and
dimethylsilanediylbis(2-methyl-4,6-diisopropylindenyl)
zirconium dichloride and also the corresponding dimethyl zirconium compounds.

Among the compounds of the formula (Vd), particularly suitable compounds are those in which M is titanium or zirconium, X is chlorine, $C_1$–$C_4$-alkyl or phenyl, $R^{31}$ is

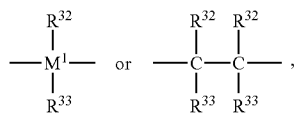

A is —O—, —S—,

and $R^{17}$ to $R^{19}$ and $R^{21}$ are hydrogen, $C_1$–$C_{10}$-alkyl, $C_3$–$C_{10}$-cycloalkyl, $C_6$–$C_{15}$-aryl or Si($R^{24}$)$_3$, or two adjacent radicals form a cyclic group having from 4 to 12 carbon atoms.

Such complexes can be synthesized by methods known per se, with preference being given to the reaction of the appropriately substituted, cyclic hydrocarbon anions with halides of titanium, zirconium, hafnium, vanadium, niobium or tantalum.

Examples of appropriate preparative methods are described, for example, in Journal of Organometallic Chemistry, 369 (1989), 359–370.

As component B), it is also possible for mixtures of various metallocene complexes to be present in the supported catalysts of the present invention.

In addition, the supported catalysts of the present invention for olefin polymerization further comprise at least one compound C) capable of forming metallocenium ions. Suitable compounds C) capable of forming metallocenium ions are, for example, strong uncharged Lewis acids, ionic compounds having Lewis acid cations or ionic compounds containing Brönsted acids as cations.

As strong, uncharged Lewis acids, preference is given to compounds of the formula (VI)

$$M^2X^1X^2X^3 \tag{VI}$$

where $M^2$ is an element of main group III of the Periodic Table, in particular B, Al or Ga, preferably B, $X^1$, $X^2$ and $X^3$ are hydrogen, $C_1$–$C_{10}$-alkyl, $C_6$–$C_{15}$-aryl, alkylaryl, arylalkyl, haloalkyl or haloaryl each having from 1 to 10 carbon atoms in the alkyl radical and from 6 to 20 carbon atoms in the aryl radical or fluorine, chlorine, bromine or iodine, in particular haloaryls, preferably pentafluorophenyl.

Particular preference is given to compounds of the formula (VI) in which $X^1$, $X^2$ and $X^3$ are identical, preferably tris(pentafluorophenyl)borane.

Suitable ionic compounds having Lewis acid cations are compounds of the formula (VII)

where

Y is an element of main groups I to VI or transition groups I to VIII of the Periodic Table.

$Q_1$ to $Q_z$ are singly negatively charged groups such as $C_1$–$C_{28}$-alkyl, $C_6$–$C_{15}$-aryl, alkylaryl, arylalkyl, haloalkyl, haloaryl each having from 6 to 20 carbon atoms in the aryl moiety and from 1 to 28 carbon atoms in the alkyl moiety, $C_3$–$C_{10}$-cycloalkyl, which may bear $C_1$–$C_{10}$-alkyl groups as substituents, halogen, $C_1$–$C_{28}$-alkoxy, $C_6$–$C_{15}$-aryloxy, silyl or mercaptyl groups, a is an integer from 1 to 6, z is an integer from 0 to 5 and d corresponds to the difference a–z, but d is greater than or equal to 1.

Particularly suitable Lewis acid cations are carbonium cations, oxonium cations and sulfonium cations and also cationic transition metal complexes. In particular, mention may be made of the triphenylmethyl cation, the silver cation and the 1,1'-dimethylferrocenyl cation. They preferably have non-coordinating counterions, in particular boron compounds as are also mentioned in WO 91/09882, preferably tetrakis(pentafluorophenyl)borate.

Ionic compounds having Brönsted acids as cations and preferably likewise non-coordinating counterions are mentioned in WO 91/09882; the preferred cation is N,N-dimethylanilinium.

The amount of strong, uncharged Lewis acids, ionic compounds having Lewis acid cations or ionic compound having Brönsted acids as cations is preferably from 0.1 to 10 equivalents, based on the metallocene complex B).

Particularly useful compounds C) capable of forming metallocenium ions are open-chain or cyclic aluminoxane compounds of the formula (VIII) or (IX)

where $R^{37}$ is a $C_1$–$C_{10}$-alkyl group, preferably a methyl or ethyl group, and m is an integer from 5 to 30, preferably from 10 to 25.

The preparation of these oligomeric aluminoxane compounds is usually carried out by reacting a solution of trialkylaluminum with water and is described, for example, in EP-A 284 708 and U.S. Pat. No. 4,794,096.

In general, the oligomeric aluminoxane compounds obtained in this way are in the form of mixtures of both linear and cyclic chain molecules of various lengths, so that m should be regarded as a mean value. The aluminoxane compounds can also be present in admixture with other metal alkyls, preferably aluminum alkyls.

It has been found to be advantageous to use the metallocene complexes B) and the oligomeric aluminoxane compounds of the formulae (VIII) and (IX) in such amounts that the atomic ratio of aluminum from the oligomeric aluminoxane compounds to the transition metal from the metallocene complexes is in the range from 10:1 to $10^6$:1, in particular in the range from 10:1 to $10^4$:1.

Furthermore, it is possible to use aryloxyaluminoxanes as described in U.S. Pat. No. 5,391,793, aminoaluminoxanes as described in U.S. Pat. No. 5,371,260, aminoaluminoxane hydrochlorides as described in EP-A 633 264, siloxyaluminoxanes as described in EP-A 621 279 or mixtures thereof as component C) in place of the aluminoxane compounds of the formula (VIII) or (IX).

Preferably, both the metallocene complexes B) and the compounds C) capable of forming metallocenium ions are used in solution, with particular preference being given to aromatic hydrocarbons having from 6 to 20 carbon atoms, in particular xylenes and toluene.

The supported catalysts of the present invention for olefin polymerization can further comprise, as additional component D), one or more metal compounds of the formula (X)

$$M^3(R^{38})_r(R^{39})_s(R^{40})_t \qquad (X)$$

where

M³ is an alkali metal, an alkaline earth metal or a metal of main group III of the Periodic Table, i.e. boron, aluminum, gallium, indium or thallium, $R^{38}$ is hydrogen, $C_1$–$C_{10}$-alkyl, $C_6$–$C_{15}$-aryl, alkylaryl or arylalkyl each having from 1 to 10 carbon atoms in the alkyl part and from 6 to 20 carbon atoms in the aryl part, $R^{39}$ and $R^{40}$ are hydrogen, halogen, $C_1$–$C_{10}$-alkyl, $C_6$–$C_{15}$-aryl, alkylaryl, arylalkyl or alkoxy each having from 1 to 10 carbon atoms in the alkyl part and from 6 to 20 carbon atoms in the aryl part, r is an integer from 1 to 3 and s and t are integers from 0 to 2, where the sum r+s+t corresponds to the valence of M³.

Among the metal compounds of the formula (X), preference is given to those in which M³ is lithium, magnesium or aluminum and $R^{39}$ and $R^{40}$ are $C_1$–$C_{10}$-alkyl.

Particularly preferred metal compounds of the formula (X) are n-butyllithium, n-butyl-n-octylmagnesium, n-butyl-n-heptylmagnesium, tri-n-hexylaluminum, triisobutylaluminum, triethylaluminum and trimethylaluminum.

If a metal compound D) is used, it is preferably present in the catalyst system in such an amount that the molar ratio of M³ from formula (X) to transition metal M from formula (V) is from 800:1 to 1:1, in particular from 500:1 to 50:1.

The supported catalysts are preferably prepared by first preparing a copolymer A) by polymerization in solution in a suitable solvent, e.g. an aromatic solvent such as toluene, or copolymerizing appropriate monomers and then converting the resulting copolymer into the copolymer A) by polymer-analogous reaction in solution. The further steps are then carried out using this solution. Alternatively, a separately prepared copolymer A) which is then present, for example, as a solid is dissolved in a suitable solvent.

B) and C) are then added to this solution of the copolymer A). The order of addition is in principle immaterial. However, preference is given to first mixing B) and C) with one another in solution and then adding this mixture to the solution of the copolymer A).

The compounds of the formula (X) used as component D) can be added to the copolymer A) prior to the addition of the metallocene complexes B) and the compounds C) capable of forming metallocene ions. In particular, such a compound of the formula (X) is added prior to the components B) and C) when the copolymer A) contains acidic hydrogen atoms in the monomer units III. However, it is also possible to mix the same or other compounds of the formula (X) first with the metallocene complexes B) and then to add these mixtures to the copolymer A).

Since the copolymer A) is brought into contact with the metallocene complexes B) and the compounds C) capable of forming metallocenium ions in a homogeneous solution, a homogeneous distribution of the active components is ensured by this means.

Before or after addition of the metallocene complexes B) and the compounds C) capable of forming metallocene ions to the copolymer A), the latter is preferably crosslinked in the solution at from 0 to 150° C., in particular from 50 to 100° C., by means of a Diels-Alder reaction of the cyclopentadienyl radicals. However, the resulting crosslinked polymer is swollen to such an extent that it behaves like a homogeneous solution.

In general, addition of the components B) and C) to A) forms a solid which, after removal of the solvent, is in finely divided form, preferably as particles having mean particle diameters in the range from 5 to 200 µm, in particular from 20 to 100 µm.

After isolation, the resulting crosslinked polymer containing the bound metallocene complexes is largely insoluble in organic solvents and in this form is suitable for use in polymerization reactions in the gas phase or in suspension.

Under thermal stress, i.e., for example, during the polymerization reaction or during subsequent work-up steps, for instance during an extrusion, this insoluble supported catalyst can fragment in a retro-Diels-Alder reaction to form the soluble copolymer chains again. The supported catalyst which has been fragmented in this way can as a result become particularly homogeneously distributed in the polymer formed.

Like the supported catalysts of the present invention, the copolymers comprising the monomer units I, II and IIIa have also not been known hitherto. These copolymers can be used as support material for a wide variety of metallocene catalysts.

The supported catalysts of the present invention are useful, for example, for the polymerization of olefins and particularly for the polymerization of α-olefins, i.e. hydrocarbons having terminal double bonds. Suitable monomers may be functionalized olefinically unsaturated compounds such as ester or amide derivatives of acrylic or methacrylic acid, for example acrylates, methacrylates or acrylonitrile. Preference is given to non polar olefinic compounds, including aryl-substituted α-olefins. Particularly preferred α-olefins are linear or branched $C_2$–$C_{12}$-alk-1-enes, in particular linear $C_2$–$C_{10}$-alk-1-enes such as ethylene, propylene, 1-butene, 1-pentene, 1-hexene, 1-heptene, 1-octene, 1-nonene, 1-decene or 4-methyl-1-pentene, or unsubstituted or substituted vinyl aromatic compounds of the formula (XI)

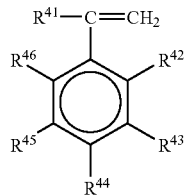

(XI)

where the substituents have the following meanings:

$R^{41}$ is hydrogen or $C_1$- to $C_4$-alkyl preferably hydrogen;

$R^{42}$ to $R^{46}$ are, independently of one another, hydrogen, $C_1$–$C_{12}$-alkyl, $C_6$–$C_{18}$-aryl or halogen or two adjacent radicals together form a group having from 4 to 15 carbon atoms; preferably hydrogen, $C_1$- to $C_4$-alkyl, chlorine, phenyl, biphenyl, naphthalene or anthracene or two adjacent radicals together form a group having from 4 to 12 carbon atoms so as to give, for example, naphthalene derivatives or anthracene derivatives as compounds of the formula V.

Examples of preferred vinyl aromatic monomers are styrene, p-methylstyrene, p-chlorostyrene, 2,4-dimethylstyrene, 4-vinylbiphenyl, vinylnaphthalene or vinylanthracene.

It is also possible to polymerize mixtures of various α-olefins.

In particular, the supported catalysts of the present invention can be used in various processes for the polymerization of ethylene, propylene or styrene. Apart from the homopolymerization of ethylene, propylene or styrene, the supported catalysts of the present invention are particularly suitable for copolymerization since the catalysts lead to uniform incorporation of the comonomer into the polymer and generally to narrow molar mass distributions. As comonomers in ethylene polymerization, preference is given to using $C_3$- to $C_8$-α-olefins, in particular butene, pentene, hexene and/or octene. Preferred comonomers in propylene polymerization are ethylene and/or butene.

The polymerization process of the present invention is generally carried out at from −50 to 300° C., preferably from 0 to 150° C., and at pressures in the range from 0.5 to 3000 bar, preferably in the range from 1 to 80 bar.

The polymerization can be carried out in solution, in suspension, in liquid monomers or in the gas phase. The polymerization is preferably carried out in liquid monomers, in suspension or by a gas-phase process, with preference being given to processes in a stirred gas phase or in a gas-phase fluidized bed.

The supported catalysts of the present invention have, in particular, a homogeneous distribution of the catalyst components on the support material and can be prepared without any great effort with many different metallocene systems. The active component is strongly bound to the support in these supported catalysts, and a good polymer morphology is obtained even at an elevated polymerization temperature.

EXAMPLES

Example 1

Preparation of a Styrene-p-chloromethylstyrene-p-bromostyrene Copolymer Comprising 30 mol % of Chloromethylstyrene, 10 mol % of Bromostyrene and 60 mol % of Styrene 6 mmol (916 mg) of p-chloromethylstyrene, 2 mmol (366 mg) of p-bromostyrene and 12 mmol (1.25 g) of styrene were dissolved in 2.5 ml of toluene and polymerized using 50 mg of AIBN at 70° C. for 24 hours. The solution was diluted to 25 ml with dichloromethane and the polymer was precipitated from 250 ml of methanol and dried under reduced pressure.

Yield: 72%.

The p-chloromethyl content could be determined by means of $^1$H-NMR spectroscopy and was 30 mol %.

$^1$H-NMR (CDCl$_3$, 250 MHz) (ppm): 4.49 (bs, 2H, Ph—CH$_2$—Cl)

Example 2

Preparation of a Styrene-p-methoxymethylstyrene-p-bromostyrene Copolymer 1 g of the copolymer obtained in Example 1 (comprising 2.37 mmol of p-chloromethylstyrene) was dissolved in a mixture of 25 ml of methanol and 50 ml of THF and, after addition of 1280 mg (23.7 mmol) of sodium methoxide, was heated at 60° C. for 24 hours. This converted the chloromethyl groups into methoxymethyl units. Sodium chloride was precipitated during the reaction. The solution was evaporated to 10 ml and the polymer was precipitated from 100 ml of methanol and dried under reduced pressure.

Yield: 88%.

The methoxymethyl content could be determined by means of $^1$H-NMR spectroscopy and was 30 mol %.

$^1$H-NMR (CDCl$_3$, 250 MHz) (ppm): 4.35 (bs, 2H, Ph—CH$_2$—O—), 3.32 (bs, 3H, —O—CH$_3$)

Example 3

Preparation of a Cyclopentadiene-containing Copolymer 500 mg (0.4 mmol of p-bromostyrene) of the copolymer obtained in Example 2 were dissolved in 50 ml of THF and cooled to −78° C. 0.27 ml (0.4 mmol) of n-butyllithium solution (1.5 M in hexane) was added dropwise to this solution. After 10 minutes, 0.8 ml (0.4 mmol) of a dimethylfulvene solution (0.5 M in THF) was added. After a further 10 minutes, cooling was removed and the mixture was warmed to room temperature. The solution was evaporated to 10 ml and the polymer was precipitated from 100 ml of methanol and dried under reduced pressure.

Yield: 92%.

Example 4

Preparation of Supported Catalysts

Example 4.1

Application of [Dimethyl-bis(2-methylbenzindenyl)silyl] zirconium Dichloride to a Support 100 mg of the copolymer obtained in Example 3 were heated at 80° C. in 5 ml of toluene for 24 hours. The viscosity of the solution increased noticeably. After cooling to room temperature, 1 ml of a solution of 55.2 mg (0.1 mmol) of [dimethyl-bis(2-methylbenzindenyl)silyl] zirconium dichloride in 20 ml (32 mmol of Al) of methylaluminoxane (1.6 M in toluene) was added. This resulted in precipitation of the support together with the colored metallocene. The precipitation was completed by addition of 100 ml of hexane. The supernatant, only slightly colored solution was removed by means of a syringe and the catalyst was washed once more with hexane. After the solvent had been removed again, the catalyst was dried in a high vacuum while stirring with a magnetic stirrer. The polymer was thus ground to a fine, free-flowing powder.

Example 4.2

Application of [Dimethyl-bis(2-methylindenyl)silyl] zirconium Dichloride to a Support The procedure of Example 4.1 was repeated, but 1 ml of a solution of 47.6 mg (0.1 mmol) of [dimethyl-bis (methylindenyl)silyl]zirconium dichloride in 20 ml (32 mmol of Al) of methylaluminoxane (1.6 M in toluene) was added to the copolymer obtained in Example 3. This gave a free-flowing, orange catalyst powder.

Example 4.3

Application of [Dimethyl-bis(2-methyl-4-phenylindenyl) silyl]zirconium Dichloride to a Support The procedure of Example 4.1 was repeated, but 1 ml of a solution of 60.1 mg (0.1 mmol) of [dimethyl-bis(2-methyl-4-phenylindenyl)silyl]zirconium dichloride in 20 ml (32 mmol of Al) of methylaluminoxane (1.6 M in toluene) was added to the copolymer obtained in Example 3. This gave a free-flowing, pink catalyst powder.

Example 5

Polymerization of Propylene

Example 5.1

In a 1 l autoclave, 400 ml of hexane together with 0.8 ml of a triisobutylaluminum solution (1 M in hexane) were heated to 50° C. and stirred for 15 minutes. 2.5 ml of methylaluminoxane solution (1.6 M in toluene) and in each case 50 mg of the supported catalyst prepared in Example 4.1 were added thereto and the mixture was stirred for another 15 minutes. A propene pressure of 5 bar was then slowly built up. The polymerization was carried out at constant pressure for a time of 30 minutes. A polymer having a good morphology was obtained. In particular, the absence of fine dust indicated that no active component was leached from the supported catalyst.

The polymerization results are shown in the Table.

Example 5.2

In a 1 l autoclave, 400 ml of hexane together with 0.8 ml of a triisobutylaluminum solution (1 M in hexane) were heated to 50° C. and stirred for 15 minutes. 2.5 ml of methylaluminoxane solution (1.6 M in toluene) and in each case 50 mg of the supported catalyst prepared in Example 4.2 were added thereto and the mixture was stirred for another 15 minutes. A propene pressure of 5 bar was then slowly built up. The polymerization was carried out at constant pressure for a time of 30 minutes. A polymer having a good morphology was obtained. In particular, the absence of fine dust indicated that no active component was leached from the supported catalyst.

The polymerization results are shown in the Table.

Example 5.3

In a 1 l autoclave, 400 ml of hexane together with 0.8 ml of a triisobutylaluminum solution (1 M in hexane) were heated to 50° C. and stirred for 15 minutes. 2.5 ml of methylaluminoxane solution (1.6 M in toluene) and in each case 50 mg of the supported catalyst prepared in Example 4.3 were added thereto and the mixture was stirred for another 15 minutes. A propene pressure of 5 bar was then slowly built up. The polymerization was carried out at constant pressure for a time of 30 minutes. A polymer having a good morphology was obtained. In particular, the absence of fine dust indicated that no active component was leached from the supported catalyst.

The polymerization results are shown in the Table.

TABLE

| Example | Yield [g] | Activity [kg PP/ (mol Zr h bar)] | Productivity [g PP/ (g cat. h bar)] |
|---|---|---|---|
| 5.1. | 11.2 | 3300 | 90 |
| 5.2. | 23.6 | 6800 | 190 |
| 5.3. | 27.4 | 8200 | 220 |

We claim:

1. A supported catalyst for olefin polymerization comprising

A) as support material, a copolymer comprising at least the monomer units I, II and III, where the monomer units I have the formula (I) and the monomer units II have the formula (II),

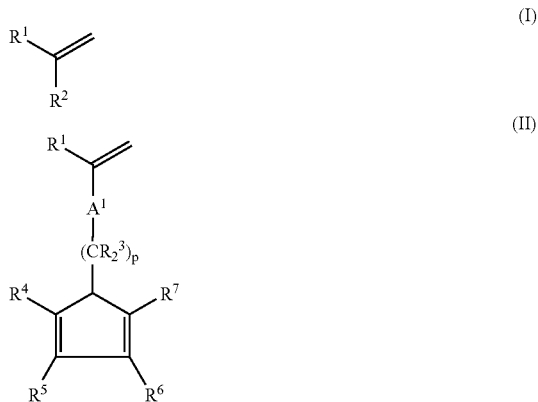

where the variables have the following meanings:

$R^1$ is hydrogen, $C_1$–$C_4$-alkyl or phenyl, $R^2$ is substituted or unsubstituted aryl or branched or unbranched alkyl or alkenyl, $A^1$ is directed chemical bond or a substituted or unsubstituted phenylene group, $R^3$ are identical or different and are each hydrogen, $C_1$–$C_{10}$-alkyl or substituted or unsubstituted phenyl, p is an integer from 0 to 8, and $R^4$ to $R^7$ are hydrogen, $C_1$–$C_{10}$-alkyl or substituted or unsubstituted phenyl and the monomer units III have polar groups, and B) at least one metallocene complex of the formula (V)

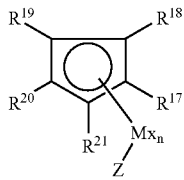
(V)

where the substituents and indices have the following meanings:
M is titanium, zirconium, hafnium, vanadium, niobium, tantalum or chromium or an element of transition group III of the Periodic Table and of the lanthanides,
X is fluorine, chlorine, bromine, iodine, hydrogen, $C_1$–$C_{10}$-alkyl, $C_6$–$C_{15}$-aryl, alkylaryl having from 1 to 10 carbon atoms in the alkyl radical and from 6 to 20 carbon atoms in the aryl radical, —$OR^{22}$ or —$NR^{22}R^{23}$,
n is 1, 2 or 3, where n corresponds to the valence of M minus 2,
where
$R^{22}$ and $R^{23}$ are $C_1$–$C_{10}$-alkyl, $C_6$–$C_{15}$-aryl, alkylaryl, arylalkyl, fluoroalkyl or fluoroaryl, each having from 1 to 10 carbon atoms in the alkyl radical and from 6 to 20 carbon atoms in the aryl radical and the radicals X are identical or different,
$R^{17}$ to $R^{21}$ are hydrogen, $C_1$–$C_{10}$-alkyl, 5- to 7-membered cycloalkyl which may in turn bear $C_1$–$C_{10}$-alkyl groups as substituents, $C_6$–$C_{15}$-aryl or arylalkyl, where two adjacent radicals may together form a saturated or unsaturated cyclic group having from 4 to 15 carbon atoms, or $Si(R^{24})_3$ where
$R^{24}$ is $C_1$–$C_{10}$-alkyl, $C_3$–$C_{10}$-cycloalkyl or $C_6$–$C_{15}$-aryl and
z is as defined for X or is

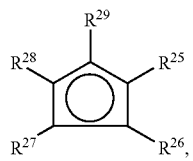

where the radicals
$R^{25}$ to $R^{29}$ are hydrogen, $C_1$–$C_{10}$-alkyl, 5- to 7-membered cycloalkyl which may in turn bear $C_1$–$C_{10}$-alkyl groups as substituents, $C_6$–$C_{15}$-aryl or arylalkyl, where two adjacent radicals may together form a saturated or unsaturated cyclic group having from 4 to 15 carbon atoms, or $Si(R^{30})_3$ where
$R^{30}$ is $C_1$–$C_{10}$-alkyl, $C_3$–$C_{10}$-cycloalkyl or $C_6$–$C_{15}$-aryl,
or the radical $R^{20}$ and Z together form an —$R^{31}$—A- group where

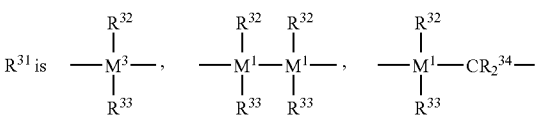

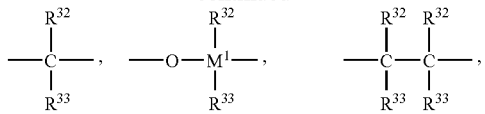

where
$=BR^{32}$, $=AlR^{32}$, —Ge—, —Sn—, —O—, —S—, $=SO$, $=SO_2$, $=CO$, $=PR^{32}$ or $P(O)R^{32}$, where
$R^{32}$, $R^{33}$ and $R^{34}$ are identical or different and are each a hydrogen atom, a halogen atom, a $C_1$–$C_{10}$-alkyl group, a $C_1$–$C_{10}$-fluoroalkyl group, a $C_6$–$C_{10}$-fluoroaryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group, or a $C_7$–$C_{40}$-alkylaryl group or two adjacent radicals together with the atoms connecting them form a saturated or unsaturated ring having from 4 to 15 carbon atoms, and
$M^1$ is silicon, germanium or tin,
A is —O—, —S—,

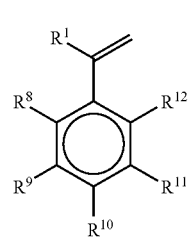

where
$R^{35}$ is $C_1$–$C_{10}$-alkyl, $C_6$–$C_{15}$-aryl, $C_3$–$C_{10}$-cycloalkyl, $C_7$–$C_{18}$-alkylaryl or $Si(R^{36})_3$, where
$R^{36}$ is hydrogen, $C_1$–$C_{10}$-alkyl, $C_6$–$C_{15}$-aryl which may in turn bear $C_1$–$C_4$-alkyl groups as substituents or $C_3$–$C_{10}$-cycloalkyl, or the radicals $R^{20}$ and $R^{28}$ together from an —$R^{31}$-group and C) is at least one compound capable of forming metallocenium ions.

2. A supported catalyst as claimed in claim 1, wherein the monomer units III are compounds of the formula (IIIa),

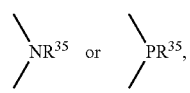
(IIIa)

where $R^8$ to $R^{12}$ are hydrogen, $C_1$–$C_{10}$-alkyl, 5- to 7-membered cycloalkyl which may in turn bear $C_1$–$C_{10}$-alkyl groups as substituents, $C_6$–$C_{15}$-aryl or arylalkyl, or the radicals may together with adjacent radicals in each case form a saturated or unsaturated ring having from 5 to 15 carbon atoms, but at least one radical $R^8$ to $R^{12}$ is a group of the formula (IV),

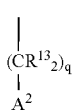

(IV)

where
$R^{13}$ are identical or different and are each hydrogen, $C_1$–$C_{10}$-alkyl or substituted or unsubstituted phenyl,
q is an integer from 0 to 8 and
$A^2$ is a group $OR^{14}$, $NR^{14}R^{15}$, $PR^{14}R^{15}$, CN, $COOR^{14}$ or $(O-(CH_2)_{q'})_{q''}-OR^{14}$, where $R^{14}$ and $R^{15}$ are identical or different and are each hydrogen or $C_1$–$C_4$-alkyl and q' is an integer from 1 to 5 and q" is an integer from 1 to 8,
or the monomer units III are compounds of the formula (IIIb),

(IIIb)

where
$A^1$ is $COOR^{16}$ or CN, where
$R^{16}$ is hydrogen or $C_1$–$C_{10}$-alkyl.

3. A supported catalyst as claimed in claim 1, wherein the copolymer A) is crosslinked via the monomer units II.

4. A supported catalyst as claimed in claim 1 which further comprises, as additional component D), one or more metal compounds which are different from C) and have the formula (X)

$$M^3(R^{38})_r(R^{39})_s(R^{40})_t \qquad (X)$$

where
$M^3$ is an alkali metal, an alkaline earth metal or a metal of main group III of the Periodic Table, i.e. boron, aluminum, gallium, indium or thallium, $R^{38}$ is hydrogen, $C_1$–$C_{10}$-alkyl, $C_6$–$C_{15}$-aryl, alkylaryl or arylalkyl or alkoxy each having from 1 to 10 carbon atoms in the alkyl radical and from 6 to 20 carbon atoms in the aryl radical, $R^{39}$ and $R^{40}$ are hydrogen, halogen, $C_1$–$C_{10}$-alkyl, $C_6$–$C_{15}$-aryl, alkylaryl, arylalkyl or alkoxy each having from 1 to 10 carbon atoms in the alkyl part and from 6 to 20 carbon atoms in the aryl part, r is an integer from 1 to 3 and s and t are integers from 0 to 2, where the sum r+s+t corresponds to the valence of $M^3$.

5. A supported catalyst as claimed in claim 4, wherein the copolymer A) serving as support material has been pretreated with compounds of the formula (X) prior to application of metallocene complex B) and compound C) capable of forming metallocenium ions.

6. A process for preparing supported catalysts as claimed in claim 1, which comprises preparing copolymers comprising the monomer units I, II and III in solution or dissolving the copolymers in a suitable solvent after they have been prepared and adding the metallocene complex B) and the compound C) capable of forming metallocenium ions to this solution.

7. A process for preparing supported catalysts as claimed in claim 6, wherein the copolymer A) is crosslinked at from 0 to 150° C. by means of a Diels-Alder reaction either before or after the addition of metallocene complex B) and compound C) capable of forming metallocenium ions.

8. A process for preparing supported catalysts as claimed in claim 6, wherein the copolymer A) is pretreated with compounds of the formula (X) prior to the addition of metallocene complex B) and compound C) capable of forming metallocenium ions.

9. A process for the polymerization of olefins by contacting an olefin in the presence of the supported catalyst of claim 1.

* * * * *